(12) United States Patent
Yue

(10) Patent No.: US 11,756,703 B1
(45) Date of Patent: Sep. 12, 2023

(54) MAGNETIC DATA CABLE

(71) Applicant: Wenyong Yue, Shenzhen (CN)

(72) Inventor: Wenyong Yue, Shenzhen (CN)

( * ) Notice: Subject to any disclaimer, the term of this patent is extended or adjusted under 35 U.S.C. 154(b) by 0 days.

(21) Appl. No.: 18/302,164

(22) Filed: Apr. 18, 2023

(30) Foreign Application Priority Data

Apr. 11, 2023 (CN) .......................... 202310377554.2

(51) Int. Cl.
*H01B 7/02* (2006.01)
*H01B 11/00* (2006.01)

(52) U.S. Cl.
CPC ........... *H01B 7/0275* (2013.01); *H01B 11/00* (2013.01)

(58) Field of Classification Search
CPC ... H01B 7/0275; H01B 11/00; H01R 13/6205
See application file for complete search history.

(56) References Cited

U.S. PATENT DOCUMENTS

| | | | | |
|---|---|---|---|---|
| 6,225,556 B1* | 5/2001 | Saito | .................. | H01F 1/14725 |
| | | | | 148/668 |
| 7,342,172 B1* | 3/2008 | Wang | ................. | H01B 11/1083 |
| | | | | 174/36 |
| 2004/0055772 A1* | 3/2004 | Tsutsui | ............... | H01B 11/1016 |
| | | | | 174/36 |
| 2015/0170798 A1* | 6/2015 | Chen | ...................... | H01B 3/002 |
| | | | | 174/113 R |
| 2016/0293295 A1* | 10/2016 | Huang | .................. | H01B 11/183 |
| 2016/0295754 A1* | 10/2016 | Huang | .................. | H01B 11/00 |
| 2020/0161731 A1* | 5/2020 | Himi | ......................... | H01P 5/08 |
| 2021/0074450 A1* | 3/2021 | Harris, Sr. | ............. | H01R 31/06 |

* cited by examiner

*Primary Examiner* — Hoa C Nguyen
*Assistant Examiner* — Amol H Patel
(74) *Attorney, Agent, or Firm* — Daniel M. Cohn; Howard M. Cohn

(57) ABSTRACT

A magnetic data cable includes a cable body and data connectors. The data connectors are respectively connected to two ends of the cable body. The cable body includes a cable core and a wrapping material layer wrapped around the cable core. At least one layer of the wrapping material layer is a magnetic material layer. When the magnetic data cable is wound into coils, each two adjacent coils arranged from top to bottom or each two adjacent coils arranged from left to right are magnetically attracted to each other by the magnetic material layer. Since the magnetic material layer is integrally distributed in the wrapping material layer, so the cable body 100 is magnetic and it is easy and simple to adjust a diameter of the coils by winding.

7 Claims, 4 Drawing Sheets

MAGNETIC DATA CABLE

TECHNICAL FIELD

The present disclosure relates to a technical field of digital products, and in particular to a magnetic data cable.

BACKGROUND

A data cable, which generally has a long length, is a common charging component of electronic devices. The data cable is easily entwined when carrying, so it takes a lot of time to unwind the data cable, which is troublesome. Further, an appearance of the data cable entwined is not beautiful and the data cable entwined also occupies a large space. A conventional data cable on the market generally has a defect of inconvenient storage. When the data cable is in a storage state, since the data cable is flexible, the data cable looks messy. Especially, when the data cable is stored in a handbag, a pocket, a backpack, or other application scenarios with narrow space, the messy data cable not only occupies a large space, but also affects the user to take out other items in the same application scenario. In summary, the conventional data cable is inconvenient to use, looks very messy, and has a poor use experience.

In order to facilitate storage of data cables, data cables with magnetic attraction storage are created.

For example, the CN patent No. CN212392445U discloses a magnetic data cable, in which magnet blocks are sleeved on a data cable body and the data cable body is folded into coils via the magnet blocks. The magnet blocks magnetically attract each other for storage.

Further, the CN patent No. CN211655236U discloses a magnetic data cable, where magnetic portions are arranged on a cable body, and a cable body is wound into coils stacked together for storage, and the magnetic portions arranged on each upper layer and the magnetic portions arranged on an adjacent lower layer thereof suck each other after winding to position the cable body.

Furthermore, the CN patent No. CN213717212U discloses a magnetic data cable which is convenient to storage, in which magnetic rings are sleeved on a main body of the magnetic data cable. When the magnetic data cable needs to be stored, the magnetic data cable is neatly stored by the magnetic rings.

However, in technical solutions disclosed in the above-mentioned patents, when the magnetic data cable is wound and stored, it is wound by attraction of the magnetic portions (or the magnet blocks/the magnetic rings). After winding, each two adjacent coils are positioned. When winding, the magnetic portions (or the magnet blocks/the magnet rings) arranged on the upper layer of the coils and the adjacent lower layer of the coils needs to be aligned in order to be sucked together. Therefore, a winding operation is tedious and is limited by a size of the coils limited by the magnetic portion (or the magnet blocks/the magnetic rings), and a diameter of the wound magnetic data cable is not flexible.

In addition, the magnetic rings are used in the prior art, in order to ensure a strength of the magnetic rings, a thickness of a wall of each of the magnetic rings needs to be greater than 1.5 mm, so a diameter of data cable increases by at least 3 mm. Under same conductive parameters, the diameter of the data cable is increased and a weight of the data cable is increased.

SUMMARY

The present disclosure provides a magnetic data cable to solve the above technical problems.

One embodiment of the present disclosure provides the magnetic data cable.

The magnetic data cable comprises a cable body and data connectors. The data connectors are respectively connected to two ends of the cable body. The cable body comprises a cable core and a wrapping material layer wrapped around the cable core. At least one layer of the wrapping material layer is a magnetic material layer.

Optionally, the magnetic material layer is directly wrapped around an outer side of the cable core. The magnetic material layer is formed by extruding and molding of a mixture of plastic and magnetic powder. The wrapping material layer further comprises an outer protective layer wrapped around an outer side of the magnetic material layer.

Optionally, the outer protective layer is a woven mesh layer formed by weaving a braided fabric.

Optionally, the wrapping material layer further comprises an inner protective layer and an outer protective layer. The inner protective layer is wrapped around an outer side of the cable core. The magnetic material layer is wrapped around an outer side of the inner protective layer. The outer protective layer is wrapped around an outer side of the magnetic material layer. The magnetic material layer is formed by extruding and molding of a mixture of plastic and magnetic powder.

Optionally, one of the data connectors is a USB Type-C data connector.

Optionally, one of the data connectors is a Lightning data connector.

Optionally, one of the data connectors is an audio data connector.

In the embodiment, compared to a conventional magnetic data cable, the magnetic data cable comprises at least one layer of magnetic material layer in the wrapping material layer wrapped around the cable core. When the magnetic data cable is wound into coils, each two adjacent coils arranged from top to bottom or each two adjacent coils arranged from left to right are magnetically attracted to each other by the magnetic material layer. Since the magnetic material layer is integrally distributed in the wrapping material layer, it is easy and simple to adjust a diameter of the coils by winding. On the contrary, a diameter of coils of the conventional magnetic data cable is limited by positions of magnetic portion (or magnet blocks/magnetic rings) in the prior art. It is convenient to adjust the diameter of the coils of the magnetic data cable of the present disclosure after winding for storage.

In the conventional magnetic data cable, when one of the magnetic portions (or the magnet blocks/the magnet rings) arranged on the data cable is damaged, the conventional magnetic data cable is difficult to storage. However, in the present disclosure, the magnetic data cable comprises the magnetic material layer continuously distributed in the wrapping material layer, so the magnetic material layer is not easily damaged, which ensures the magnetic attraction effect of each two adjacent coils of the coils of the data cable after winding.

The conventional magnetic data cable comprises the magnetic portions (or the magnet blocks/the magnetic rings) arranged at intervals, so that the conventional magnetic data cable is unable to be integrally formed and is not made in one piece. The magnetic data cable provided by the present disclosure is easy to be made in one piece because the magnetic material layer is integrally formed in the wrapping material layer.

In the present disclosure, the magnetic material layer is extruded into shape from a mixture of plastic and magnetic powder, and the magnetic material layer only has a thickness of 0.5 mm, which reduces a diameter of the magnetic data cable as well as a weight of the magnetic data cable.

BRIEF DESCRIPTION OF DRAWINGS

In order to clearly describe technical solutions in embodiments of the present disclosure or embodiments in the prior art, the following will briefly introduce the drawings that need to be used in the description of the embodiments or the prior art. Apparently, the drawings in the following description are merely some of the embodiments of the present disclosure, and those skilled in the art are able to obtain other drawings according to the drawings without contributing any inventive labor.

DETAILED DESCRIPTION

Technical solutions in the embodiments of the present disclosure will be clearly and completely described below in conjunction with the accompanying drawings in the embodiments of the present disclosure. Obviously, the described embodiments are only a part of the embodiments of the present disclosure, rather than all of the embodiments. Based on the embodiments of the present disclosure, all other embodiments obtained by those of ordinary skill in the art without creative work shall fall within the protection scope of the present disclosure.

Reference herein to "embodiment" means that a particular feature, structure, or characteristic described in connection with one embodiment may be included in at least one embodiment of the present disclosure. The appearances of the "embodiment" in various positions in the specification are not necessarily referring to the same embodiment, and are not independent or alternative embodiments mutually exclusive of other embodiments. Those skilled in the art explicitly and implicitly understand that the embodiments described herein may be combined with other embodiments.

Embodiment 1

Figure 1:
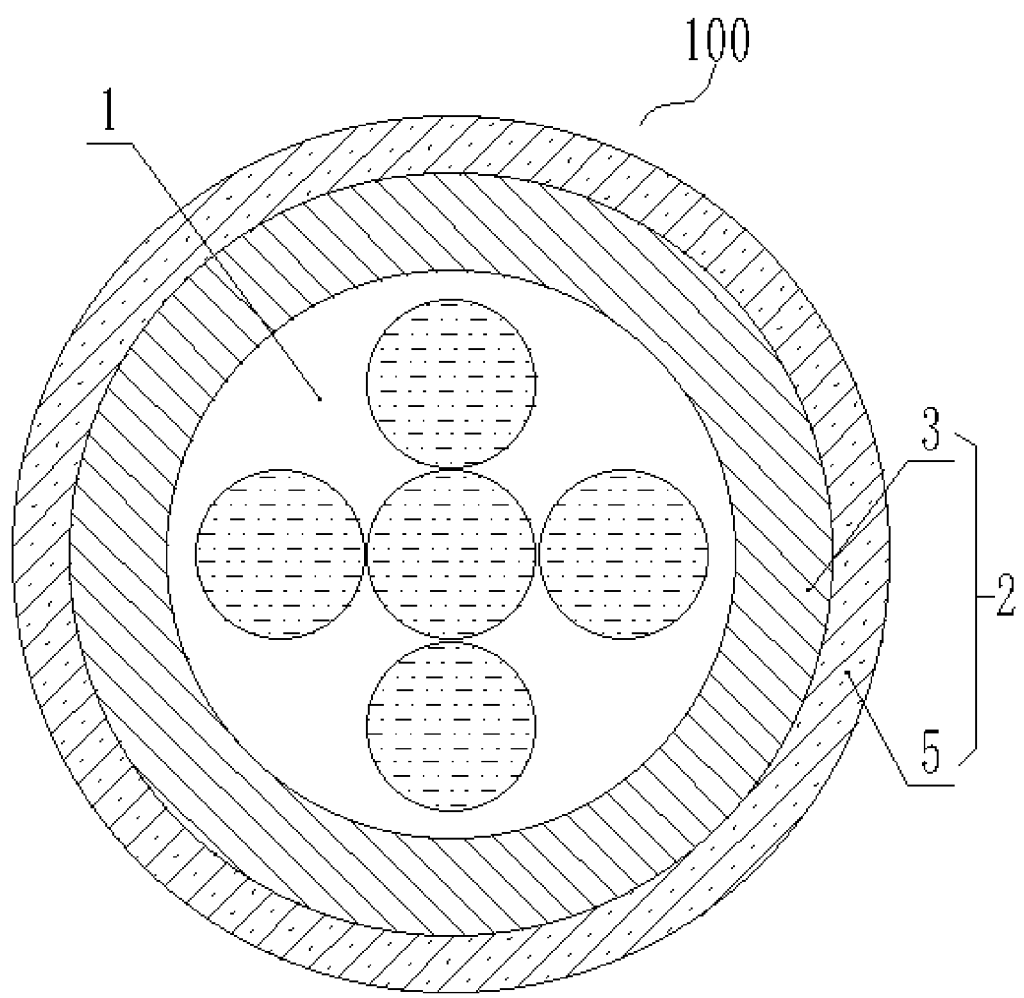
FIG. 1 is a cross-sectional schematic diagram of a cable body of a magnetic data cable according to a first embodiment of the present disclosure.

As shown in FIG. 1, which shows a magnetic data cable according to a first embodiment of the present disclosure.

The magnetic data cable comprises a cable body 100 and data connectors 6. The data connectors are respectively connected to two ends of the cable body. The cable body 100 comprises a cable core 1 and a wrapping material layer 2 wrapped around the cable core 1. At least one layer of the wrapping material layer 2 is a magnetic material layer 3.

In the embodiment, the magnetic material layer 3 is directly wrapped around an outer side of the cable core 1. The magnetic material layer is formed by extruding and molding of a mixture of plastic and magnetic powder. The wrapping material layer 2 further comprises an outer protective layer 5 wrapped around an outer side of the magnetic material layer 3.

In the embodiment, the outer protective layer 5 is a woven mesh layer formed by weaving a braided fabric. The woven mesh layer formed by weaving the braided fabric enhances toughness of the magnetic data cable, which prevents the magnetic data cable from breaking.

In the embodiment, the data connectors 6 are respectively selected from a USB Type-C data connector, a Lightning data connector, or an audio data connector.

Embodiment 2

Figure 2:
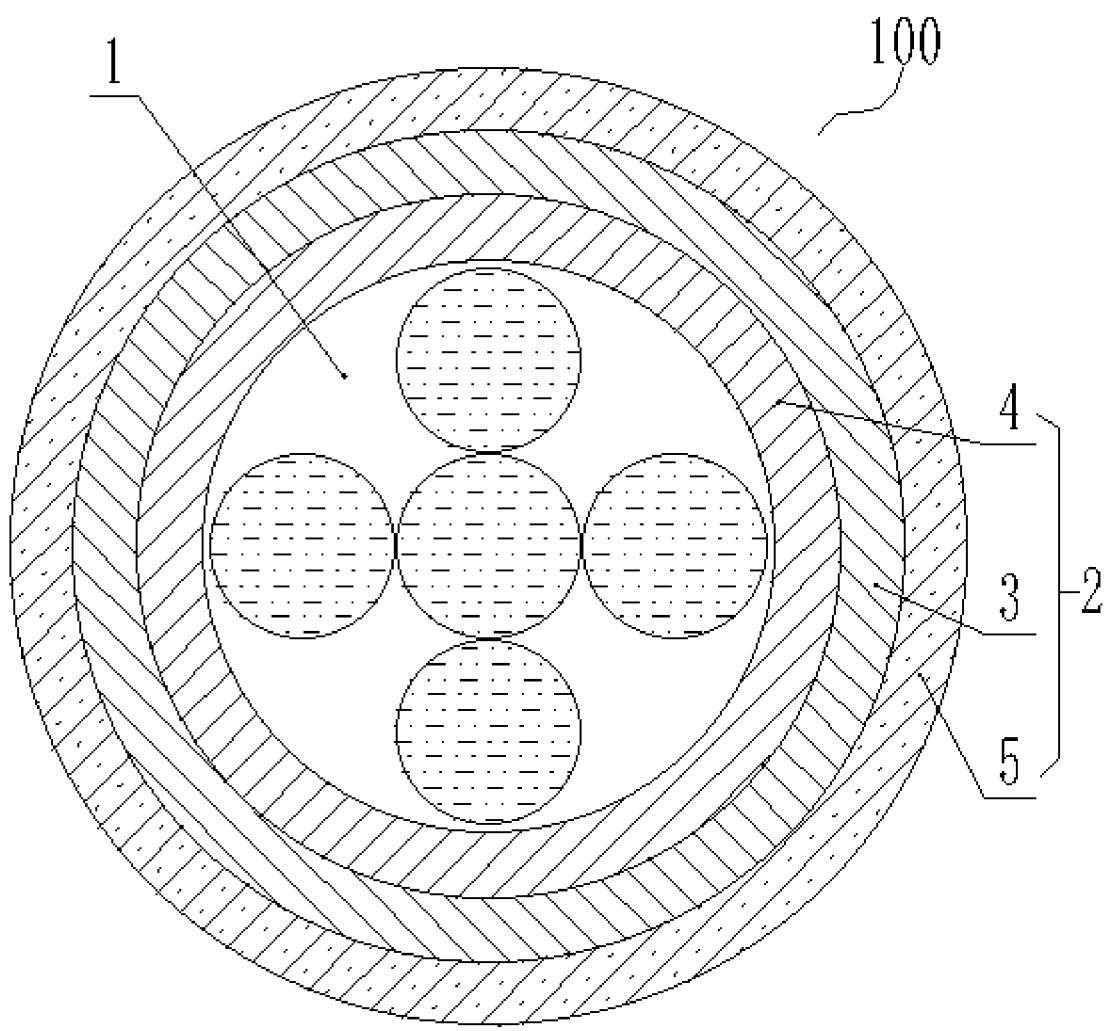
FIG. 2 is a cross-sectional schematic diagram of the cable body of the magnetic data cable according to a second embodiment of the present disclosure.

As shown in FIG. 2, which shows the magnetic data cable according to a second embodiment of the present disclosure. Based on the above embodiment, the wrapping material layer 2 of the cable body 2 further comprises an inner protective layer 4 and an outer protective layer 5. The inner protective layer 4 is wrapped around an outer side of the cable core 1. The magnetic material layer 3 is wrapped around an outer side of the inner protective layer 4. The outer protective layer 5 is wrapped around an outer side of the magnetic material layer 3. The magnetic material layer 3 is formed by extruding and molding of a mixture of plastic and magnetic powder. By arranging the inner protective layer 4 between the cable core 1 and the magnetic material layer 3, when the magnetic data cable is bent, the cable core is protected and is prevented from directly contacting the magnetic material layer 3. Thus, the cable core and the magnetic material layer are prevented from friction, and the magnetic material layer 3 is prevented from being damaged. Furthermore, the outer protective layer 5 is wrapped around an outer side of the magnetic material layer 3, which prevents the magnetic data cable from breaking.

In the embodiment, the data connectors 6 are respectively selected from a USB Type-C data connector, a Lightning data connector, or an audio data connector.

Figure 3:
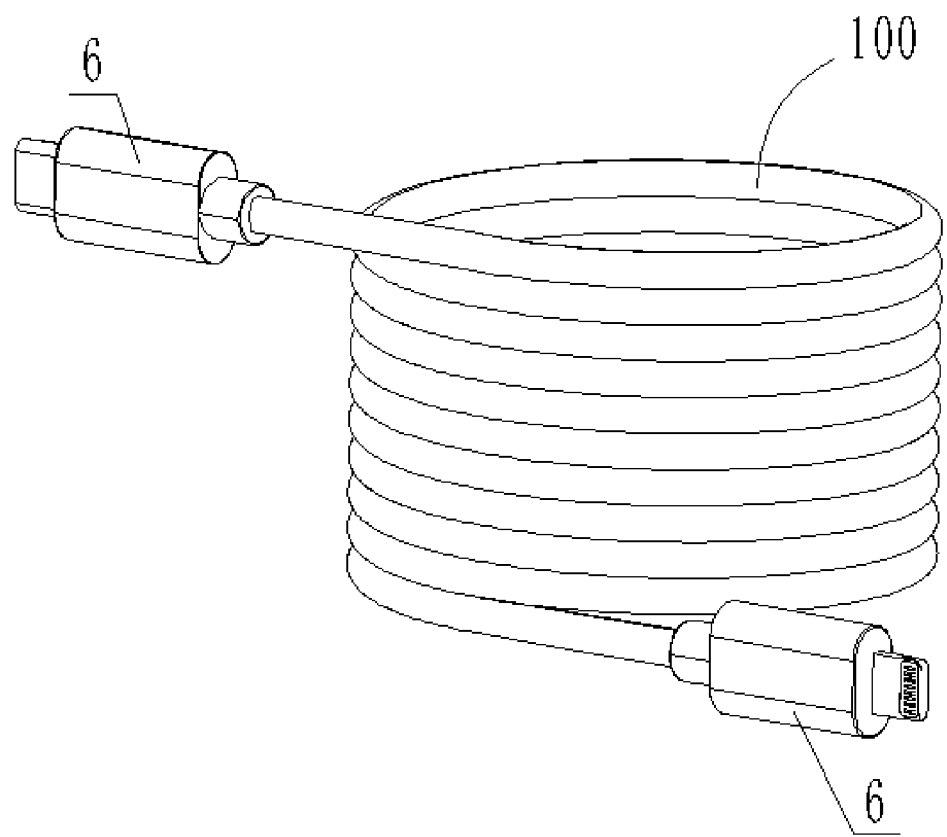
FIG. 3 is a schematic diagram of the magnetic data cable of the present disclosure where the magnetic data cable is in a first wound state.
Figure 4:
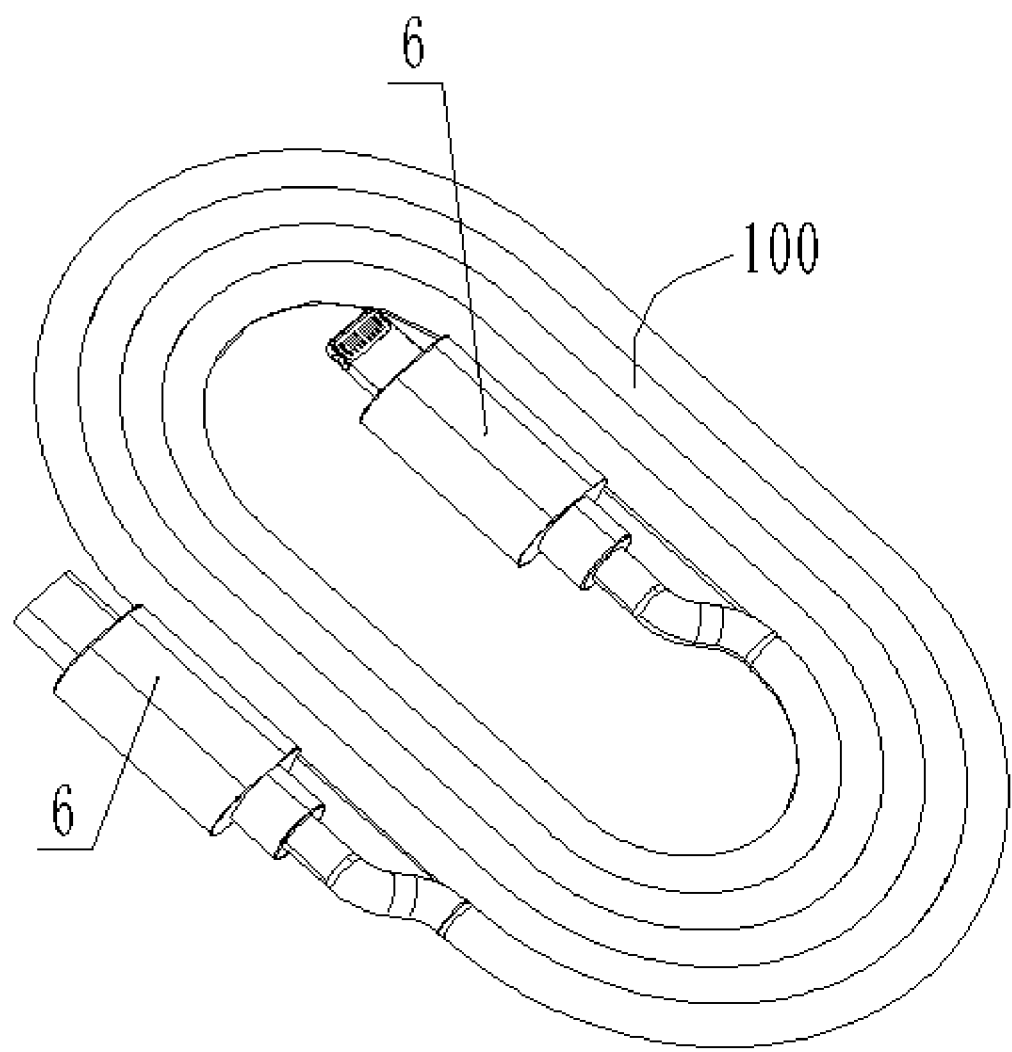
FIG. 4 is a schematic diagram of the magnetic data cable of the present disclosure where the magnetic data cable is in a second wound state.

Wound states of the magnetic data cable of the present disclosure is as shown in FIGS. 3 and 4. When the magnetic data cable is wound into coils, each two adjacent coils arranged from top to bottom or each two adjacent coils arranged from left to right are magnetically attracted to each other by the magnetic material layer. Since the magnetic material layer is integrally distributed in the wrapping material layer, so the cable body 100 is magnetic and it is easy and simple to adjust a diameter of the coils by winding. On the contrary, a diameter of coils of the conventional magnetic data cable is limited by positions of magnetic portion (or magnet blocks/magnetic rings) in the prior art. It is convenient to adjust the diameter of the coils of the magnetic data cable of the present disclosure after winding for storage.

In actual use, the magnetic data cable provided by the present disclosure can not only be vertically stacked into the coils of a cylinder shape (as shown in FIG. 3), but also can be horizontally stacked into the coils in a tape shape (as shown in FIG. 4), which saves a size of the magnetic data cable, makes the magnetic data cable easy to be stored in a bag, and saves a storage space of the magnetic data cable.

What is claimed is:

1. A magnetic data cable, comprising: a cable body and data connectors; the data connectors are respectively connected to two ends of the cable body; the cable body comprises a cable core and a wrapping material layer wrapped around the cable core; at least one layer of the wrapping material layer is a magnetic material layer;

wherein the magnetic material layer is directly wrapped around an outer side of the cable core; the magnetic material layer is formed by extruding and molding of a mixture of plastic and magnetic powder; the wrapping material layer further comprises an outer protective layer wrapped around an outer side of the magnetic material layer.

2. The magnetic data cable according to claim 1, wherein the outer protective layer is a woven mesh layer formed by weaving a braided fabric.

3. The magnetic data cable according to claim 1, wherein the wrapping material layer further comprises an inner protective layer and an outer protective layer, the inner protective layer is wrapped around an outer side of the cable core; the magnetic material layer is wrapped around an outer side of the inner protective layer; the outer protective layer is wrapped around an outer side of the magnetic material layer; and the magnetic material layer is formed by extruding and molding of a mixture of plastic and magnetic powder.

4. The magnetic data cable according to claim 1, wherein one of the data connectors is a USB Type-C data connector.

5. The magnetic data cable according to claim 1, wherein one of the data connectors is a Lightning data connector.

6. The magnetic data cable according to claim 1, wherein one of the data connectors is an audio data connector.

7. A magnetic data cable, comprising: a cable body and data connectors; the data connectors are respectively connected to two ends of the cable body; the cable body comprises a cable core and a wrapping material layer wrapped around the cable core; at least one layer of the wrapping material layer is a magnetic material layer;

wherein the wrapping material layer further comprises an inner protective layer and an outer protective layer, the inner protective layer is wrapped around an outer side of the cable core; the magnetic material layer is wrapped around an outer side of the inner protective layer; the outer protective layer is wrapped around an outer side of the magnetic material layer; and the magnetic material layer is formed by extruding and molding of a mixture of plastic and magnetic powder.

* * * * *